US005998017A

United States Patent [19]
Eichbauer

[11] Patent Number: 5,998,017
[45] Date of Patent: *Dec. 7, 1999

[54] STRETCH WRAP FILMS

[75] Inventor: George Eichbauer, Fairport, N.Y.

[73] Assignee: Tenneco Packaging, Evanston, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/614,297

[22] Filed: Mar. 12, 1996

[51] Int. Cl.⁶ .................................................. B32B 27/32
[52] U.S. Cl. ........................ 428/343; 428/354; 428/355; 428/515; 428/516; 52/399
[58] Field of Search .................................. 428/515, 516, 428/506, 517, 343, 354, 355; 53/399

[56] References Cited

U.S. PATENT DOCUMENTS

| | | | |
|---|---|---|---|
| 3,645,992 | 2/1972 | Elston | 260/80.78 |
| 3,748,962 | 7/1973 | Hilkert et al. | 90/4 |
| 3,986,611 | 10/1976 | Dreher | 206/386 |
| 4,011,382 | 3/1977 | Levine et al. | 526/96 |
| 4,050,211 | 9/1977 | Lancaster, III et al. | 53/211 |
| 4,076,698 | 2/1978 | Anderson et al. | 526/348.6 |
| 4,163,831 | 8/1979 | Gessell | 526/153 |
| 4,205,021 | 5/1980 | Morita et al. | 525/240 |
| 4,302,565 | 11/1981 | Goeke et al. | 526/88 |
| 4,302,566 | 11/1981 | Karol et al. | 526/125 |
| 4,359,561 | 11/1982 | Fraser et al. | 526/88 |
| 4,399,173 | 8/1983 | Anthony et al. | 428/35 |
| 4,399,180 | 8/1983 | Briggs et al. | 428/212 |
| 4,418,114 | 11/1983 | Briggs et al. | 428/218 |
| 4,461,873 | 7/1984 | Bailey et al. | 525/240 |
| 4,511,609 | 4/1985 | Craver et al. | 428/35 |
| 4,522,987 | 6/1985 | Hogan et al. | 526/106 |
| 4,565,720 | 1/1986 | Yaeo et al. | 428/35 |
| 4,574,104 | 3/1986 | Aishima et al. | 428/220 |

(List continued on next page.)

FOREIGN PATENT DOCUMENTS

| | | |
|---|---|---|
| 0 600 425 | 11/1993 | European Pat. Off. . |
| WO 92/17539 | 10/1992 | WIPO . |
| WO 94/14855 | 7/1994 | WIPO . |
| WO 94/25271 | 11/1994 | WIPO . |
| WO 94/26816 | 11/1994 | WIPO . |

OTHER PUBLICATIONS

Leaversuch, R., "LDPE, mPE vie in Flexible Film Market", *Modern Plastics* Sep. 1994, 23,25.

Product Literature, Dow Chemical Company, "Dow Resins for Stretch Film Applications—An Overview", p. 1.5, Oct., 1994.

Product Literature, Dow Chemical Company, "Dow Skin Resins for Cast Stretch Film Applications", pp. 3.1–3.4, Oct., 1994.

Product Literature, Dow Chemical Company, "ENGAGE Polyolefin Elastomer for Industrial Collation Packaging", KC 8852, May, 1994.

Chowdhury, et al., "Polymers by Blueprint: Metallocene catalysts, the biggest thing to hit plastics since LLDPE, transform workhorse resins into engineering plastics," *Chemical Engineering* (Apr. 1993), pp. 34–39.

(List continued on next page.)

*Primary Examiner*—D. S. Nakarani
*Assistant Examiner*—D Lawrence Tarazano
*Attorney, Agent, or Firm*—Arnold White & Durkee

[57] ABSTRACT

The present invention provides for improved polyolefin stretch wrap films having superior cling force, load retention, tear resistance and puncture resistance properties and for the methods of using those stretch wrap films. The stretch wrap films generally have a thickness of from about 0.4 to about 3 mils, a cling force onto itself of at least 140 g/inch, an F-50 dart drop strength of at least about 150 g/mil. The stretch wrap films are constructed in a multilayer fashion having at least one outside cling polyethylene copolymer layer containing a polyethylene resin preferably produced through metallocene catalyst technology.

81 Claims, 1 Drawing Sheet

U.S. PATENT DOCUMENTS

| | | | |
|---|---|---|---|
| 4,588,650 | 5/1986 | Mientus et al. | 428/516 |
| 4,808,561 | 2/1989 | Welborn, Jr. | 502/104 |
| 4,833,017 | 5/1989 | Benoit | 428/323 |
| 4,871,523 | 10/1989 | Datta et al. | 423/265 |
| 4,871,705 | 10/1989 | Hoel | 502/117 |
| 4,925,821 | 5/1990 | Chang | 502/107 |
| 4,925,825 | 5/1990 | Tachi et al. | 502/309 |
| 4,937,301 | 6/1990 | Chang | 526/128 |
| 5,001,205 | 3/1991 | Hoel | 526/128 |
| 5,006,500 | 4/1991 | Chang | 502/107 |
| 5,017,655 | 5/1991 | Kase et al. | 525/127 |
| 5,019,315 | 5/1991 | Wilson | 264/171 |
| 5,026,798 | 6/1991 | Canich | 526/127 |
| 5,032,652 | 7/1991 | Chang | 526/129 |
| 5,049,423 | 9/1991 | German, Jr. | 428/35.2 |
| 5,079,205 | 1/1992 | Canich | 502/117 |
| 5,084,534 | 1/1992 | Welborn, Jr. et al. | 526/160 |
| 5,085,927 | 2/1992 | Dohrer | 428/220 |
| 5,124,418 | 6/1992 | Welborn, Jr. | 526/114 |
| 5,173,343 | 12/1992 | Arvedson et al. | 428/34.9 |
| 5,183,867 | 2/1993 | Welborn, Jr. | 526/114 |
| 5,206,075 | 4/1993 | Hodgson, Jr. | 428/216 |
| 5,248,547 | 9/1993 | Wilson | 428/218 |
| 5,273,809 | 12/1993 | Simmons | 428/212 |
| 5,278,272 | 1/1994 | Lai et al. | 526/348.5 |
| 5,283,128 | 2/1994 | Wilhoit | 428/516 |
| 5,296,580 | 3/1994 | Matsunaga et al. | 528/502 |
| 5,334,428 | 8/1994 | Dobreski et al. | 428/34.9 |
| 5,358,792 | 10/1994 | Mehta et al. | 428/516 |
| 5,374,459 | 12/1994 | Mumpower et al. | 428/36.7 |
| 5,376,439 | 12/1994 | Hodgson et al. | 428/220 |
| 5,380,810 | 1/1995 | Lai et al. | 526/352 |
| 5,382,631 | 1/1995 | Stehling et al. | 525/240 |
| 5,395,471 | 3/1995 | Obijeski et al. | 156/244.11 |
| 5,397,613 | 3/1995 | Georgelos | 428/36.7 |
| 5,397,640 | 3/1995 | Georgelos et al. | 428/349 |
| 5,399,426 | 3/1995 | Koch et al. | 428/335 |
| 5,407,732 | 4/1995 | Dokurno | 428/213 |
| 5,419,795 | 5/1995 | Wood et al. | 156/184 |
| 5,419,934 | 5/1995 | Wilson | 428/34.9 |
| 5,420,220 | 5/1995 | Cheruvu et al. | 526/348.1 |
| 5,431,284 | 7/1995 | Wilson | 206/597 |
| 5,451,450 | 9/1995 | Erderly et al. | 428/220 |
| 5,451,468 | 9/1995 | Seiler et al. | 428/515 |
| 5,462,807 | 10/1995 | Halle et al. | 428/500 |
| 5,482,770 | 1/1996 | Bekele | 428/339 |
| 5,482,771 | 1/1996 | Shah | 428/349 |
| 5,491,019 | 2/1996 | Kuo | 428/213 |
| 5,523,136 | 6/1996 | Fischer et al. | 428/35.2 |
| 5,530,065 | 6/1996 | Farley et al. | 525/240 |
| 5,543,223 | 8/1996 | Shah | 428/349 |
| 5,558,930 | 9/1996 | DiPoto | 428/216 |
| 5,595,050 | 1/1997 | Koch et al. | 53/441 |
| 5,617,707 | 4/1997 | Simmons | 53/441 |
| 5,749,202 | 5/1998 | Eichbauer | 53/399 |
| 5,752,362 | 5/1998 | Eichbauer | 53/399 |

OTHER PUBLICATIONS

Product Literature, To Give Your Customers' Used Stretch Film A New Lease On Life, Turn The Page, Mobil, 4 pgs. 1993.

Schut, "Competition for Metallocenes Could Turn Ugly," *Plastics World* (Jan. 1995), pp. 33–36.

"Advantages of Metallocene Ethylene Polymer Resin Blends in Blown and Cast Films", *Research Disclosure*, Aug. 1995, pp. 565–573.

"Advantages of Metallocene Ethylene Polymer Resin Blends in Cast Film", *Research Disclosure* , Aug. 1995, pp. 556–557.

"Advantages of Metallocene Ethylene Polymer Resins in Blown and Cast Stretch Films", *Research Disclosure*, Aug. 1995, pp. 539–545.

STRETCH WRAP FILMS

FIELD OF THE INVENTION

The present invention is directed to stretch wrap films and methods for their use. In particular, the present invention is directed to stretch wrap films having superior puncture resistance, high elongation to break, high force to stretch the film, high cling force, and overall strength.

BACKGROUND OF THE INVENTION

The use of thermoplastic stretch wrap films for the overwrap packaging of goods, and in particular, the unitizing of palleted loads is a commercially significant application of polymer film, including generically, polyethylene. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Some of the properties desired of a good stretch wrap film are as follows: good cling or cohesion properties, high puncture resistance, high tear resistance in the transverse direction, good machine direction tear resistance, good transparency, low haze, low stress relaxation with time, high resistance to transverse tear when under machine direction tension, producible in thin gauges, low specific gravity and thus high yield in area per pound, good tensile toughness, high machine direction ultimate tensile strength, high machine direction ultimate elongation, and low modulus of elasticity.

Physical properties which are particularly significant for the successful use of thermoplastic films in stretch wrap applications include their puncture resistance, their elongation characteristics, their toughness and their resistance to tearing while under tension. In general, tensile toughness is measured as an area under a stress-strain curve developed for a thermoplastic film and it may be considered as the tensile energy absorbed, expressed in units of ft. lbs./cu.in. to elongate a film to break under tensile load. In turn, this toughness characteristic is a function of the capacity of such films to elongate. The process of stretching the film decreases that capacity. Accordingly, the stretch wrap process will decrease the toughness of the film while it is in its stretched condition as an overwrap as compared to its unstretched form. Generally this loss of toughness is proportional to the amount of stretch imparted to the film as it is overwrapping a load of goods.

Currently, different grades of stretch wrap films are commonly marketed for different end uses according to overall film properties. For example, certain stretch wrap films having superior properties for load retention are characterized by requiring a higher force to stretch the film. However, such load retention films generally have only fair or poor puncture characteristics at such stretch conditions. On the other hand, certain stretch wrap films having superior puncture resistance properties have low load retention properties, thus limiting their use.

A need exists to develop superior stretch wrap films characterized by having both superior load retention characteristics and puncture resistance characteristics. Such films could be used in a wider variety of end applications and thus not unduly limit users of stretch wrap films to selectively choosing a film based on its properties prior to initiating a stretch wrap application.

SUMMARY OF THE INVENTION

The present invention sets forth multilayer stretch wrap thermoplastic films that are characterized by having improved cling, tear, elongation, and puncture resistance properties. The stretch wrap films can be used in cling/cling film applications. The stretch wrap film is advantageously employed in wrapping articles while under tension whereby the film itself is stretched generally to at least 2000% of its original length.

The stretch wrap film of the present invention can be prepared as a multilayer film construction. In such a construction the two outside layers have a cling force to each other of at least about 140 grams/inch. At least one of the outside cling layers preferably comprises at least 40 weight percent of a puncture resistant polyethylene resin having a polydispersity ($M_w/M_n$ or MWD) of from 1 to 4, a melt index of from 0.5 to 10 g/10 min., and a melt flow ratio ($I_{20}/I_2$) of from 12 to 22. This puncture resistant polyethylene resin is preferably produced utilizing metallocene catalyst polymerization techniques. The multilayer film also contains an interior film layer, located between the outside cling layers, that provides load retention and transverse direction tear resistance. The resin comprising the tear resistant layer forms a film having a higher transverse direction tear resistance than films constructed with the resins that comprise the outside cling layers.

The multilayer films of the present invention have been found to display unexpectedly superior film properties compared to other film constructions, surprisingly without undue degradation of other important film properties. The incorporation of the puncture resistant resin in at least one outside cling layer with an internal transverse direction tear resistant layer, using the resins for those layers as set forth herein, has produced an overall film that has superior elongation characteristics. Also, the films of the present invention display enhanced transverse direction tear properties without a concomitant loss of machine direction tear properties.

DETAILED DESCRIPTION OF THE INVENTION

Figure 1:
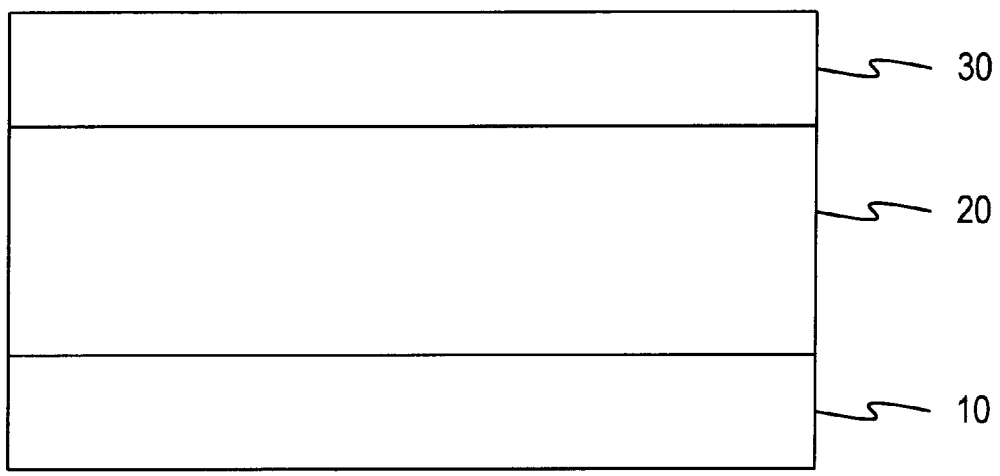
FIG. 1 shows a three layer film constructed in accordance with the present invention.

The present invention sets forth cast, multilayer stretch wrap thermoplastic films that are characterized by having a relatively high cling force, a relatively high puncture resistance, and a relatively high tear resistance in both the transverse and machine directions. The multilayer stretch wrap films of the present invention can be constructed with outer film layers possessing advantageous cling and/or puncture resistance properties. Between these outer layers the films can be constructed with at least one layer of a thermoplastic polymeric material possessing superior transverse direction tear properties and high machine direction tensile strength. The stretch wrap films are preferably constructed as a three layer cast film for ease of manufacture. These multilayer stretch wrap films can be cast by conventional coextrusion techniques.

The FIGURE discloses a three layer cast stretch wrap film having a first surface layer 10 and an opposing surface layer 30. The interposed layer 20 is positioned between the two surface layers.

At least one of the outside cling layers of the stretch wrap films of the present invention, such as layer 10, is constructed with a polymer resin that possesses superior puncture resistance, and preferably superior machine direction tear resistance. This puncture resistant film layer is constructed with a partially crystalline polyethylene resin, hereinafter "puncture resistant resin", that is a polymer prepared with ethylene and at least one alpha olefin monomer, e.g. a copolymer or terpolymer. The alpha olefin monomer generally has from 3 to about 12 carbon atoms, preferably from 4 to 10 carbon atoms, and more preferably from 6 to 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene, 4-methyl-1-pentene, 1-octene, 1-decene, and 1-dodecene. The puncture resistant resin generally has the characteristics associated with an LLDPE material, however it has improved properties as explained more fully below. The puncture resistant resin defined herein will have a density of from 0.88 to 0.94 g/cm$^3$, preferably from 0.88 to 0.93 g/cm$^3$, and more preferably from 0.88 to 0.925 g/cm$^3$.

The weight average molecular weight of the puncture resistant resin can generally range from about 20,000 to about 500,000, preferably from about 50,000 to about 200,000. The molecular weight is determined by commonly used techniques such as size exclusion chromatography or gel permeation chromatography. The puncture resistant resin should have a molecular weight distribution, or polydispersity, ($M_w/M_n$, "MWD") within the range of about 1 to about 4, preferably about 1.5 to about 4, more preferably about 2 to 4, and even more preferably from 2 to 3. The ratio of the third moment to the second moment, $M_z/M_w$, is generally below 2.3, preferably below 2.0, and more typically in the range of from about 1.6–1.95. The melt flow ratio (MFR) of these resins, defined as $I_{20}/I_2$ and as determined in accordance to ASTM D-1238, is generally from about 12 to about 22, preferably from about 14 to about 20, and more preferably from about 16 to about 18. The melt index (MI), defined as the $I_2$ value, should be in the range of from about 0.5 to about 10 g/10 min. preferably from about 1 to about 5 g/10 min.

Useful puncture resistant resin materials are available from, among others, Dow Chemical Company and Exxon Chemical Company who are producers of single site or constrained geometry catalyzed polyethylenes. These resins are commercially available as the AFFINITY and EXXACT polyethylenes (see *Plastics World*, p.33–36, January 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382,631, 5,380,810, 5,358,792, 5,206,075, 5, 183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is hereby incorporated herein by reference in its entirety. These catalyst systems and their use to prepare such puncture resistant resin materials are also set forth in EP 0 600 425 A1 and PCT applications WO 94/25271 and 94/26816. The polyethylene resins thus produced generally have a crystalline content in excess of at least 10 weight percent, generally in excess of at least 15 weight percent.

The above patents and publications generally report that these catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3–10 metal or Lanthanide series element, generally a Group IVB, VB, or VIB metal; A and B are independently halogen, hydrocarbyl group, or hydrocarboxyl groups having 1–20 carbon atoms; a=0–3, b=0–3, and c=1–3. The reactions can take place in either gas phase, high pressure, slurry, or solution polymerization schemes.

At least one of the outside cling layers of the films of the present invention is preferably constructed entirely with the puncture resistant resin, preferably produced through the metallocene catalyst technology. This outside cling layer can also be constructed with a blend of the puncture resistant resin with a second resin material. The second resin material is preferably a LLDPE resin having a density of between about 0.89 and 0.94 g/cm$^3$, a LDPE resin having a density of between about 0.9 and 0.935 g/cm$^3$, or VLDPE resin having a density of between about 0.88 and 0.91 g/cm$^3$. The comonomer for the second resin material preferably has from 4–10, more preferably 6–8 carbon atoms. If a second resin material is to be incorporated with the puncture resistant resin, it is preferred to maintain the level of the puncture resistant resin to at least 40 weight percent, preferably at least 50 weight percent, and more preferably at least 60 weight percent, of the blended resin film. The resultant blended polymer resin maintains the desired properties of the puncture resistant resin material and may be more economical for certain applications.

The cling properties of the outer, puncture resistant film layer used as layer 10 in the stretch wrap film can be enhanced by incorporating cling additives or by blending with the puncture resistant resin a polymeric resin that inherently possesses superior cling properties, or a combination of both techniques. Examples of useful cling additives include poly-isobutylenes (PIB) having a number average molecular weight in the range from about 1,000–3,000, preferably about 1200–1800, as measured by vapor phase osmometry, amorphous atactic polypropylenes, e.g., those having an average molecular weight of about 2000, and polyterpenes. Examples of cling enhancing resins include, but are not limited to, ethylene-vinyl acetate (EVA) copolymers containing from about 5–15 weight percent copolymerized vinyl acetate and VLDPE resins having densities from 0.88 to 0.912 and melt indexes from 0.5 to 10 g/10 min. The optional cling additive can be present in the puncture resistant, outer film layer in a concentration of from about 0.5 to about 10 weight percent of the resin, and preferred contents for polyisobutylene are from about 0.5 to about 10, and more preferably from about 0.5 to about 6, weight percent—this generally being about 0.4–5 weight percent of the overall film.

Polymeric resins that inherently possess superior cling properties, and that can be blended with the puncture resistant resin to form either or both of the outside layers (10,30) are LLDPE resins having a relatively high weight percentage of n-hexane extractibles, as measured by the n-hexane extractibles method of 21 C.F.R. 177.1520. Generally, the LLDPE resin will contain from about 4 to about 10, preferably from about 5 to about 10, more preferably from about 5 to about 8, weight percent of n-hexane extractibles. The LLDPE resin has a density ranging from about 0.890 to about 0.940 g/cm$^3$, more commonly from about 0.90 to about 0.93 g/cm$^3$, and a melt index of from about 1 to about 10 g/10 min Particularly preferred are those LLDPE resins possessing densities within the range from about 0.917 to 0.920 gm/cm$^3$ and a melt index within the range from about 2.0 to 5.0 g/10 min. Examples of such LLDPE resins include those set forth in U.S. Pat. No. 5,273,809, which is hereby incorporated by reference in its entirety. Preferably, such LLDPE resins can be blended with the puncture resistant resin in amounts of up to about 60, preferably from about 25–60, and more preferably from about 40–60, percent by weight.

The opposing surface layer 30 of the stretch wrap film is preferably constructed with the puncture resistant resin as described previously for the first outer surface layer 10. This opposing surface film layer can be constructed with either a blend of the puncture resistant resin material with the same second resin materials as noted previously, or it can be constructed solely with the puncture resistant resin. The opposing surface layer 30 of the stretch wrap film can also be constructed with those previously described LLDPE resins that possess superior cling properties and have a relatively high weight percentage of n-hexane extractibles as set forth in U.S. Pat. No. 5,273,809. The opposing surface layer 30 of the stretch wrap film can also be constructed with a LLDPE resin, having a density of from about 0.89–0.94 g/cm$^3$ and a melt index of from about 1–10 g/10 min, that contains a cling additive, such as PIB, in the form and amounts as previously described with respect to the opposing outer film layer 10. The opposing surface layer 30 of the stretch wrap film can also be constructed with an ethylene-acrylate polymer, such as a polymer containing from about 10–40% by weight acrylate, as shown in U.S. Pat. No. 5,049,423, which is incorporated herein in its entirety by reference.

The polyethylene resins that can be used in the outside cling layers herein can be blended or alloyed with minor amounts, e.g., up to about 20 weight percent total, of one or more other suitable resins to achieve a desired range of physical/mechanical properties in the film product. Thus, for example, such resins as ethyl vinyl acetate (EVA) copolymer, HPLDPE, and other LLDPE resins may be used for blending to obtain useful mixtures for forming the outside cling layers of the films of this invention. Of course, other conventional film additives such as antioxidants, UV stabilizers, pigments, dyes, etc., can be present in the usual amounts in the resins constituting the film layers 10, 30 of the stretch wrap films.

The two surface layers 10, 30 of the stretch wrap film of the present invention preferably exhibit a cling force of at least about 140, preferably at least about 180, more preferably at least about 220, and in some cases at least 260, grams/inch as determined by the ASTM D 5458-94 test method. Generally, the cling force of the outside cling layers will be in the range of from about 140–300 grams/inch.

The multilayer stretch wrap films of the present invention contain at least one inner film layer 20, located between the two outside cling layers 10, 30, of a thermoplastic material possessing superior transverse direction tear properties. The resin utilized in this film layer also contributes to the multilayer films of the present invention the ability to strain harden during the use of the film. The strain hardening characteristic can be generally described as the requirement to exert a higher force to continually stretch the film beyond its already stretched state. This film layer increases the machine direction tensile strength of the overall film.

Resins useful for preparing this transverse direction tear film layer include high pressure low density polyethylenes (HPLDPE) having a density within the range of from about 0.90 to about 0.935 g/cm$^3$ with a melt index of from about 0.5 to about 10 g/10 min. A preferred HPLDPE resin is one having a density in the range of from about 0.915 to about 0.925 g/cm$^3$, a melt index of from about 1 to about 10, preferably having a melt index from about 1 to about 5, and more preferably having a melt index of from 1 to 2.5 g/10 min. Other types of resins useful for preparing this film layer include polypropylene, generally isotatic polypropylene in a density range of 0.89–0.91 g/cm$^3$ and a melt flow rate of from 5–25 g/10 min. as determined by ASTM D1238, ethylene-propylene copolymers having a density of between about 0.89 and 0.91 g/cm$^3$ and a melt flow rate of from 2–10 g/10 min., and linear low density polyethylene resins having a density of between about 0.89 and 0.935 g/cm$^3$ and having a melt index of below 2.0 g/10 min. The resin used for this tear resistant film layer preferably has a higher transverse direction tear resistance than the resins employed for the other film layers, e.g. the outside cling layers, and the puncture resistant film layer. That is, if separate films were prepared from each resin used for the individual film layers of the multilayer stretch wrap films of the present invention, the resins used for the transverse direction tear resistant layer would produce a film having a higher transverse direction tear level than the films prepared from the resins used to prepare the outside layers and the puncture resistant layer.

The overall stretch wrap films have relatively high puncture resistance, as measured by the F-50 dart drop test procedure (ASTM D1709). It is the experience of those skilled in the art that the F-50 dart drop test is well correlated to the end use puncture resistance of stretch wrap films. The F-50 dart drop value of the films is at least about 150 g/mil, preferably at least about 250 g/mil, and more preferably from at least about 350 g/mil. The multilayer films generally have an F-50 dart drop value below about 900 g/mil.

The stretch wrap films of the present invention are preferably constructed so that the overall transverse direction tear, as determined by ASTM D1922, is at least about 500 g/mil, preferably at least about 600 g/mil, more preferably at least about 700 g/mil. The machine direction tear of the film is generally at least about 175 g/mil, preferably at least about 225 g/mil, and more preferably at least about 275 g/mil.

A parameter used to analyze the performance of stretch wrap films is the force required to stretch the film to a desired percentage of its original length. This force is indicative of the load retention characteristics of the film. The films of the present invention generally have a force to stretch the film to 200w of at least about 1600 psi, preferably at least about 1800 psi, more preferably at least about 2000 psi, and in some cases at least about 2200 psi, as determined by ASTM D882. The films of the present invention generally have a force to stretch the film to 250% of at least about 1800 psi, preferably at least about 2000 psi, more preferably at least about 2250 psi, and in some cases at least about 2500 psi.

The film configurations are constructed according to conventional practices. Generally, the preferred processing technique is to coextrude and cast the films in a simultaneous fashion, however in some cases it may be appropriate to first coextrude at least two film layers and thereafter extrusion coat the remaining film layer. It is preferred to employ known and conventional techniques of coextrusion to assemble the composite structures of the films of this invention. Reference may be made to U.S. Pat. No. 3,748, 962, the contents of which are incorporated by reference herein, for details of a coextrusion procedure which can be employed in the fabrication of a multilayer film in accordance with this invention. Generally, the resin materials are heated to their molten state and their viscosities are coordinated to prepare multilayer films in a uniform manner. The molten materials are conveyed to a coextrusion adapter that combines the molten materials to form a multilayer coextruded structure. The layered polymeric material is transferred through an extrusion die opened to a predetermined gap commonly in the range of between about 0.05 in. (0.13 cm) and 0.012 in. (0.03 cm). The material is then drawn down to the intended gauge thickness by means of a primary chill or casting roll maintained at about 60–130° F. (15–55° C). Typical draw down ratios range from about 5:1 to about 40:1.

The overall thickness of the stretch wrap film can vary widely according to end use specifications, but is generally in the range of the typical thicknesses for stretch wrap films. Conventional for such films is a thickness of from about 0.4 to about 3 mils, which is application specific.

In the present invention wherein the multilayer films are of a coextruded nature, it is preferred that the outer film layers comprise from about 70 to about 98, preferably from about 75 to about 95, and more preferably from about 80 to about 95, weight percent of the total film weight. The inner film layer(s) of the transverse direction tear resistant film material comprise from about 2 to about 30, preferably from about 5 to about 25, and more preferably from about 5 to about 20, weight percent of the total film weight. It is preferred that the puncture resistant resin content of the stretch wrap film be generally at least about 40 weight percent, and preferably at least about 60 or 70 weight percent of the film.

It has been found that the benefits provided from the transverse direction tear resistant film material are substantially obtained with up to about 20 weight percent of the overall film. The incorporation of this film layer at these levels, in conjunction with the incorporation of the puncture resistant film layer, has led to an unexpected improvement in the machine direction tensile elongation, and machine direction stretch properties of the overall films. These properties have been found to be appreciably enhanced surprisingly without a significant loss of other important film properties, and as a result the overall film stretch wrap performance has been enhanced.

Either or both of the outside cling surfaces of the film can be treated by such known and conventional post-forming operations as corona discharge, chemical treatment, flame treatment, etc., to modify the printability or ink receptivity of the surface(s) or to impart other desirable characteristics thereto.

The stretch wrap film of this invention can, if desired, be provided in the non-stretched, i.e., unoriented, or at most only modestly stretched, state prior to use. The films of the present invention are capable of being stretched from at least about 10, more commonly at least about 100 or at least about 200, and in some cases at least about 300, linear percent during the overwrapping operation.

The pallet unitizing techniques described in U.S. Pat. Nos. 3,986,611 and 4,050,221 are contemplated herein. The disclosures of these patents are incorporated herein in their entirety by reference.

EXAMPLES

The test procedures utilized in the following examples are set forth in the following Table.

The test procedures utilized in the following examples are set forth in the following Table.

| STRETCH FILM TEST PROCEDURES | |
|---|---|
| TEST PROCEDURE | ASTM TEST METHOD |
| Tensile Yield Machine Direction (MD) | D882 |
| Tensile Ultimate MD | D882 |
| Tensile Elongation MD | D882 |
| Tensile Force @ | |
| 200% Stretch | D882 |
| 250% Stretch | D882 |
| 300% Stretch | D882 |
| 350% Stretch | D882 |
| Elmendorf Tear MD | D1922 |
| Elmendorf Tear Transverse Direction (TD) | D1922 |
| Total Energy Dart Drop | D4272 |
| F-50 Dart Drop | D1709 |
| Gardner Gloss | D2457 |
| Gardner Haze | D1003 |
| Instron Peel Cling | D5458 |
| Instron Probe Puncture Energy | — |

The probe energy test was conducted by use of an Instron Universal tester that records a continuous reading of the force (stress) and penetration (strain) curve. A 6 in. by 6 in. film specimen is securely mounted to a compression load cell to expose a 4 in. by 4 in. area. A hemispherically shaped (1 in. dia.) stainless steel probe, traveling at a constant speed of 10 in./min is lowered into the film. A stress/strain curve is recorded and plotted. Peak force is the maximum force encountered. The machine is used to integrate the area under the curve, which is indicative of the energy consumed during the penetration to rupture testing of the film.

The films of the Examples were prepared using a pilot scale commercial cast film line machine. The material melt temperatures ranged from 480–580° F. and were chosen to match melt viscosities of the various resins. The melts were conveyed to a coextrusion adapter that combines the melt flows into a multilayer coextruded structure. This layered flow was distributed through a single manifold film extrusion die to the required width. The die gap opening was nominally 0.025 inches. The material was drawn down to the final gauge. The material draw down ratio was about 31:1 for the 0.8 mil films. A vacuum box was used to pin the melt exiting the die opening to a primary chill roll maintained at about 90° F.

Example 1

The following example describes the properties of films prepared using a blend of a metallocene-catalyzed polyethylene (PE) resin with a linear low density polyethylene resin. These blends can be used to construct the puncture resistant film layer of the multilayer films of the present invention.

Various films were prepared from a resin blend containing a LLDPE resin, Resin A, and a metallocene-catalyzed PE resin, Resin B. The LLDPE resin, Resin A, was a resin having a density of 0.918 g/cm$^3$, a 3.3 MI, a $M_n$ of 22,000 and a $M_w$ of 77,000. The metallocene-catalyzed PE resin, Resin B, was a hexene co-polymer polyethylene having a 3.3 MI, 0.918g/cm$^3$ density, a $M_n$ of 26,000 and a $M_w$ of 73,000. The resins were blended together and melted to form a homogeneous blend, and then extruded into a cast film having a thickness of about 0.8 mils. The film was then tested for various properties as set forth in Table 1.1.

The films were also tested for performance in a stretch wrapper constructed with equipment to determine various film properties during the stretching operation. The testing was conducted at rates similar to those employed by commercial equipment. The film width was 20 inches for this test machine. The machine direction (MD) force at 200% elongation, and maximum stretch and force values at breakage, were determined. The results are shown in Table erties should be improved for the development of superior stretch wrap films.

It has been observed that the transverse directional tear of the films prepared with at least about 20 or 40 weight percent of the metallocene-catalyzed PE resin is catastrophic. That is, in the stretched condition, these films tear in the transverse direction in a clean, straight, and thoroughly instantaneous manner when a film defect is encountered such as a small hole, tear or puncture. This is in contrast to the tear exhibited by films that do not contain the metallocene-catalyzed PE resin, such as Film 1 in this example, which exhibits a highly distorted and rippled film tear indicating the absorption of energy during the tearing process. The catastrophic tear characteristic of the films containing the metallocene-catalyzed PE resin is an undesirable characteristic for a stretch wrap film. Such catastrophic tearing events

TABLE 1.1

| TEST # | 6 | 5 | 4 | 3 | 2 | 1 |
|---|---|---|---|---|---|---|
| SAMPLE DESCRIPTION | | | | | | |
| Film Gauge (mils) | 0.80 | 0.80 | 0.80 | 0.80 | 0.80 | 0.80 |
| Configuration | Single Layer B Resin | Single Layer AB Blends | Single Layer AB Blends | Single Layer AB Blends | Single Layer AB Blends | Single Layer A Resin |
| Resin A, wt. % | 0.0 | 20.0 | 40.0 | 60.0 | 80.0 | 100 |
| Resin B, wt. % | 100.0 | 80.0 | 60.0 | 40.0 | 20.0 | 0.0 |
| LAB ANALYSIS | | | | | | |
| Tensile Ultimate MD (psi) | 4663.0 | 5915.0 | 6216.0 | 5617.0 | 4801.0 | 4977.0 |
| Tensile Elongation MD (%) | 520.0 | 585.0 | 656.0 | 638.0 | 603.0 | 603.0 |
| MD Force 200% Stretch (psi) | 1615.0 | 1671.0 | 1465.0 | 1462.0 | 1463.0 | 1500.0 |
| MD Force 250% Stretch (psi) | 1734.0 | 1836.0 | 1527.0 | 1493.0 | 1519.0 | 1549.0 |
| MD Force 300% Stretch (psi) | 1969.0 | 2131.0 | 1692.0 | 1639.0 | 1573.0 | 1607.0 |
| MD Force 350% Stretch (psi) | 2334.0 | 2510.0 | 1935.0 | 1896.0 | 1852.0 | 1890.0 |
| Elmendorf Tear MD (g/mil) | 311.0 | 330.0 | 317.0 | 281.0 | 256.0 | 221.0 |
| Elmendorf Tear TD (g/mil) | 473.0 | 548.0 | 578.0 | 635.0 | 652.0 | 638.0 |
| Instron Probe Puncture Energy (in-lbs./mil) | 19.5 | 18.2 | 18.3 | 22.9 | 21.9 | 25.1 |
| Total Energy Dart Drop (in-lbs/mil) | 58.9 | 57.4 | 29.5 | 22.5 | 15.6 | 19.0 |
| F-50 Dart Drop (gms/mil) | 515+[1] | 353.0 | 373.5 | 146.0 | 138.6 | 123.5 |
| Cling (grams/in) | 72.8 | 118.9 | 152.2 | 191.5 | 207.6 | 220.5 |
| Gloss (%) | 84.3 | 91.8 | 92.6 | 92.4 | 91.7 | 91.8 |
| Haze (%) | 2.64 | 1.58 | 1.48 | 17.20 | 1.94 | 1.88 |
| STRETCH WRAP TESTER | | | | | | |
| Force 200% Stretch (lb./in.) | 1.44 | 2.11 | 2.11 | 2.17 | 2.17 | 2.12 |
| Force Break (lb/in) | 1.62 | 2.44 | 2.46 | 2.44 | 2.44 | 2.48 |
| Maximum Stretch to Break (%) | 334.0 | 375.0 | 385.0 | 380.0 | 382.0 | 401.0 |

1 - exceeded limit of test equipment

The data in Table 1.1 show the benefit of using the metallocene-catalyzed PE resin to increase the puncture resistance of a film layer at high puncturing conditions.

For instance, the films having a majority of the metallocene-catalyzed PE resin had superior F-50 dart drop values. These films exhibited relatively low levels for cling, transverse direction tear, and tensile properties; these prop- will generally result in having to shut-down the automated stretch wrapping equipment with a significant economic loss.

Example 2

Experiments were conducted to analyze the properties of multilayer films constructed with an internal layer of a strain hardening resin possessing superior transverse direction tear properties along with outer film layers constructed with a metallocene-catalyzed polyethylene (PE) resin in comparison to the metallocene resin film, Film 6 of Example 1. The multilayer films represent films similar to the claimed films, however the metallocene-catalyzed PE resins were not blended with a cling additive, such as PIB, for this experiment.

Three films, Films 7–9, were prepared having a BCB film construction where the outer B layers were constructed with the metallocene-catalyzed PE resin used in Example 1 and the C core layer was a 2.0 MI LDPE resin, having a density of 0.921 g/cm$^3$. The two resins were coextruded with the overall B resin content set forth in Table 2.1, that content being essentially evenly split between both outside film layers. The films were then tested for various properties as set forth in Table 2.1.

The films were also tested for performance in a stretch wrap tester as in Example 1. The film width was 20 inches. The machine direction (MD) force at 200% elongation, and maximum stretch and force values at breakage, were determined. The results are shown in Table 2.1.

TABLE 2.1

| TEST # | 6 | 7 | 8 | 9 |
|---|---|---|---|---|
| SAMPLE DESCRIPTION | | | | |
| Film Gauge (mils) | 0.80 | 0.80 | 0.80 | 0.80 |
| Configuration | Single Layer Metallocene Resin | B/C/B | B/C/B | B/C/B |
| Resin B, wt. % | 100.0 | 90.0 | 80.0 | 70.0 |
| Resin C, wt. % | 0 | 10.0 | 20.0 | 30.0 |
| LAB ANALYSIS | | | | |
| Tensile Ultimate MD (psi) | 4663.0 | 5899.0 | 6663.0 | 5464.0 |
| Tensile Elongation MD (%) | 520.0 | 611.0 | 662.0 | 591.0 |
| MD Force 200% Stretch (psi) | 1615.0 | 1845.0 | 2134.0 | 2402.0 |
| MD Force 250% Stretch (psi) | 1734.0 | 1950.0 | 2272.0 | 2562.0 |
| MD Force 300% Stretch (psi) | 1969.0 | 2168.0 | 2493.0 | 2788.0 |
| MD Force 350% Stretch (psi) | 2334.0 | 2451.0 | 2758.0 | 3078.0 |
| Elmendorf Tear MD (g/mil) | 311.0 | 317.0 | 346.0 | 261.0 |
| Elmendorf Tear TD (g/rnii) | 473.0 | 515.0 | 594.0 | 805.0 |
| Instron Probe Puncture Energy (in-lbs/mil) | 19.5 | 18.3 | 16.5 | 17.7 |
| Total Energy Dart Drop (in-lbs/mil) | 58.9 | SB.3 | 46.7 | 24.8 |
| F-50 Dart Drop (g/mil) | 515+ | 451.0 | 440.0 | 206.0 |
| Cling (grams/in.) | 72.8 | 77.6 | 80.3 | 75.7 |
| Gloss (%) | 84.3 | 85.2 | 84.2 | 85.6 |
| Haze (%) | 2.64 | 2.58 | 2.56 | 2.28 |
| STRETCH WRAP TESTER | | | | |
| Force 200% Stretch (lb./in.) | 1.44 | 2.51 | 2.81 | 3.16 |
| Force Break (lb/in) | 1.62 | 2.74 | 3.21 | 3.29 |
| Maximum Stretch to Break (%) | 334.0 | 352.0 | 435.0 | 345.0 |

It was found that the elongation performance of the multilayer film constructions was unexpectedly improved due to the simultaneous incorporation of the metallocene-catalyzed PE resin film layers and the internal LDPE resin layer. These properties are particularly evident in the films containing 10% and 20% of the LDPE resin internal layer. At these lower levels of the LDPE resin internal layer, the improved film properties are obtained without a concomitant loss in the machine direction tear properties, which were actually improved in that range.

It was also found that the transverse tear characteristics of the inventive films was not of a catastrophic nature, but was more of a feathered nature, in distinction to those films containing the metallocene-catalyzed PE resin in Example 1. The preparation of films that do not exhibit catastrophic transverse direction tear failure is an important aspect to the construction of a stretch wrap film as the film will not be subject to catastrophic tear failure in use if a puncture should occur.

Example 3

Multilayer stretch wrap films are made in accordance with the present invention having a B/C/B film construction as described in Example 2. The B film layers are constructed with the same metallocene-catalyzed PE resin stated in Example 2 with the incorporation of about 3 or 4 percent by weight polyisobutylene. The C core film layer is constructed with the same LDPE resin stated in Example 2.

The multilayer films are tested for similar properties as those described in Example 2.

What is claimed is:

1. A multilayer, stretch wrap film comprising:
   (a) a first polymeric outer layer comprising at least 60 weight percent of a polyethylene resin, said polyethylene resin having a polydispersity of from 1 to 4, a density of from about 0.88 to about 0.94, a melt index of from 0.5 to 10 g/10 min., and a melt flow ratio ($I_{20}/I_2$) of from 12 to 22;
   (b) a second polymeric outer layer, at least one of said first outer layer and said second outer layer has sufficient cling resulting from inherent cling alone, cling additives or a combination thereof so as to produce a cling force to the other layer of at least about 140 grams/inch as determined by ASTM D5458-94;
   (c) an inner polymeric layer, located between said first outer layer and said second outer layer, said inner polymeric layer comprises a high pressure low density polyethylene resin, said high pressure low density polyethylene resin having a density of from about 0.90 to about 0.935 g/cm$^3$ and a melt index of from about 0.5 to about 10 g/10 min.;
   so as to produce a stretch wrap film having an F-50 dart drop value of at least 150 g/mil as determined by ASTM D1709, a machine direction tear resistance of at least about 175 g/mil as determined by ASTM D1922, a transverse direction tear resistance of at least 500 g/mil as determined by ASTM D1922 a maximum stretch % of at least 345%.

2. The stretch wrap film of claim 1 wherein said inherent cling is partially from at least one cling additive.

3. The stretch wrap film of claim 2 wherein said cling additive is polyisobutylene.

4. The stretch wrap film of claim 1 wherein the stretch wrap film has a transverse direction tear resistance of at least 600 g/mil.

5. The stretch wrap film of claim 4 wherein the stretch wrap film has a transverse direction tear resistance of at least 700 g/mil.

6. The stretch wrap film of claim 1 wherein the stretch wrap film has a machine direction tear resistance of at least 225 g/mil.

7. The stretch wrap film of claim 1 wherein at least one of said first outer layer and said second outer layer has sufficient cling resulting from inherent cling alone, cling additives or a combination thereof so as to produce a cling force to the other layer of at least 180 g/inch.

8. The stretch wrap film of claim 1 wherein the stretch wrap film has an F-50 dart drop value of at least about 250 g/mil.

9. The stretch wrap film of claim 1 wherein the stretch wrap film has a force required to elongate the film 200% of at least 1800 psi and a force required to elongate the film 250% of at least 2000 psi.

10. The stretch wrap film of claim 9 wherein the stretch wrap film has a force required to elongate the film 200% of at least 2000 psi and a force required to elongate the film 250% of at least 2250 psi.

11. The stretch wrap film of claim 1 wherein said polyethylene resin of said first outer layer is made with a metallocene catalyst.

12. The stretch wrap film of claim 1 wherein said inherent cling is partially from n-hexane extractables.

13. The stretch wrap film of claim 1 wherein said second outer layer is selected from the group consisting of linear low density polyethylene, very low density polyethylene, high pressure low density polyethylene, ethylene-acrylate polymers and mixtures thereof.

14. The stretch wrap film of claim 1 wherein said second outer layer comprises a polymer of two or more monomers, wherein a first monomer is ethylene, in a major amount by weight, and a second monomer is an alpha olefin of from about 3–12 carbon atoms, in a minor amount by weight.

15. The stretch wrap film of claim 1 wherein said stretch wrap film comprises from about 75 to about 95 weight percent of said first outer layer and said second outer layer, and comprises from about 5 to about 25 weight percent of said inner polymeric layer.

16. The stretch wrap film of claim 15 wherein said stretch wrap film comprises from about 80 to about 95 weight percent of said first outer layer and said second outer layer, and comprises from about 5 to about 20 weight percent of said inner polymeric layer.

17. The stretch wrap film of claim 1 wherein said second outer layer comprises at least 70 weight percent of a polyethylene resin, said polyethylene resin having a polydispersity of from 1 to 4, a density of from 0.88 to about 0.94 g/cm$^3$, a melt index of from 0.5 to 10 g/10 min., and a melt flow ratio ($I_{20}/I_2$) of from 12 to 22 and said first outer layer comprises at least 70 weight percent of said polyethylene resin.

18. The stretch wrap film of claim 17 wherein said second outer layer and said first outer layer each comprises 100 weight percent of said polyethylene resin.

19. The stretch wrap film of claim 18 wherein said polyethylene resin of said first layer and said second outer layer is made from a metallocene catalyst.

20. The stretch wrap film of claim 7 wherein said polyethylene resin of said first layer is a copolymer or a terpolymer.

21. A multilayer, stretch wrap film, comprising:
(a) a first outer cling layer comprising at least 40 weight percent of a polyethylene resin, said polyethylene resin having a polydispersity of from 1 to 4, a density of from about 0.88 to about 0.94 g/cm$^3$, a melt index of from 0.5 to 10 g/10 min., and a melt flow ratio ($I_{20}/I_2$) of from 12 to 22;
(b) a second outer polymeric layer comprising a polymer of two or more monomers, wherein a first monomer is ethylene, in a major amount by weight, and a second monomer is an alpha olefin of from about 3–12 carbon atoms, in a minor amount by weight, at least one of said first outer layer and said second outer layer has sufficient cling resulting from inherent cling alone, cling additives or a combination thereof so as to produce a cling force to the other layer of at least about 140 grams/inch as determined by ASTM D5458-94; and
(c) an inner polymeric layer, located between said first outer layer and said second outer layer, said inner polymeric layer comprises a high pressure low density polyethylene resin, said high pressure low density polyethylene resin having a density of from about 0.90 to about 0.935 g/cm$^3$ and a melt index of from about 0.5 to about 10 g/10 min.;
so as to produce a stretch wrap film having a F-50 dart drop value of at least 150 g/mil as determined by ASTM D1709, a machine direction tear resistance of at least about 175 g/mil as determined by ASTM D1922, a transverse direction tear resistance of at least 500 g/mil as determined by ASTM D1922 and a maximum stretch % of at least 345%.

22. The stretch wrap film of claim 21 wherein said first outer layer comprises at least about 50 weight percent of said polyethylene resin.

23. The stretch wrap film of claim 21 wherein said inherent cling is partially from at least one cling additive.

24. The stretch wrap film of claim 23 wherein said cling additive is polyisobutylene.

25. The stretch wrap film of claim 21 wherein the stretch wrap film has a transverse direction tear resistance of at least 699 g/mil.

26. The stretch wrap film of claim 25 wherein the stretch wrap film has a transverse direction tear resistance of at least 700 g/mil.

27. The stretch wrap film of claim 21 wherein the stretch wrap film has a machine direction tear resistance of at least 225 g/mil.

28. The stretch wrap film of claim 21 wherein at least one of said first outer layer and said second outer layer has sufficient cling resulting from inherent cling alone, cling additives or a combination thereof so as to produce a cling force to the other layer of at least 180 g/inch.

29. The stretch wrap film of claim 21 wherein the F-50 dart drop value of said stretch wrap film is at least about 250 mil.

30. The stretch wrap film of claim 21 wherein the stretch wrap film has a force required to elongate the film 200% of at least 1800 psi and a force required to elongate the film 250% of at least 2000 psi.

31. The stretch wrap film of claim 30 wherein the stretch wrap film has a force required to elongate the film 200% of at least 2000 psi and a force required to elongate the film 250% of at least 2250 psi.

32. The stretch wrap film of claim 21 wherein said stretch wrap film comprises from about 80 to about 95 weight percent of said first outer layer and said second outer layer, and comprises from about 5 to about 20 weight percent of said inner polymeric layer.

33. The stretch wrap film of claim 21 wherein said second outer layer comprises at least 40 weight percent of a polyethylene resin, said polyethylene resin having a polydispersity of from 1 to 4, a density of from 0.88 to about 0.94 g/cm$^3$, a melt index of from 0.5 to 10 g/10 min. , and a melt flow ratio ($I_{20}/I_2$) of from 12 to 22.

34. The stretch wrap film of claim 33 wherein said second outer layer and said first outer layer each comprises at least 60 weight percent of said polyethylene resin.

35. The stretch wrap film of claim 21 wherein said polyethylene resin of said first outer layer is made with a metallocene catalyst.

36. The stretch wrap film of claim 21 wherein said inherent cling is partially from n-hexane extractables.

37. The stretch wrap film of claim 34 wherein said second outer layer and said first outer layer each comprises 100 weight percent of said polyethylene resin.

38. The stretch wrap film of claim 37 wherein said polyethylene resin of said first outer layer and said second outer layer is made from a metallocene catalyst.

39. A method for stretch wrapping an item, comprising:
wrapping the item with a multilayer, stretch wrap film comprising:
(a) a first polymeric outer layer comprising at least 40 weight percent of a polyethylene resin, said polyethylene resin having a polydispersity of from 1 to 4, a density of from 0.88 to about 0.94 g/cm$^3$, a melt index from 0.5 to 10 g/10 min. and a melt flow ratio ($I_{20}/I_2$) of from 12 to 22;
(b) a second polymeric outer layer, at least one of said first outer layer and said second outer layer has sufficient cling resulting from inherent cling alone, cling additives or a combination thereof so as to produce a cling force to the other layer of at least about 140 grams/inch as determined by ASTM D5458-94;
(c) an inner polymeric layer, located between said first outer layer and said second outer layer, said inner polymeric layer comprises a high pressure low density polyethylene resin, said high pressure low density polyethylene resin having a density of from about 0.90 to about 0.935 g/cm$^3$ and a melt index of from about 0.5 to about 10 g/10 min.;
wherein said stretch wrap film has a thickness of from about 0.4 to about 3 mils, a F-50 dart drop value of at least 150 g/mil as determined by ASTM D1709, a machine direction tear resistance of at least about 175 g/mil as determined by ASTM D1922, a transverse direction tear resistance of at least 500 g/mil as determined by ASTM D1922 and a maximum stretch % of at least 345%; and
whereby said multilayer, stretch wrap film is stretched during the wrapping step.

40. The method of claim 39 wherein said polyethylene resin of said first outer layer is made with a metallocene catalyst.

41. The method of claim 39 wherein said first outer layer comprises at least about 50 percent of said polyethylene resin.

42. The method of claim 39 wherein said cling force is partially from at least one cling additive.

43. The method of claim 42 wherein said cling additive is polyisobutylene.

44. The method of claim 39 wherein said stretch wrap film has a transverse direction tear resistance of at least 600 g/mil.

45. The method of claim 44 wherein the stretch wrap film has a transverse direction tear resistance of at least 700 g/mil.

46. The method of claim 39 wherein said stretch wrap film has a machine direction tear resistance of at least 225 g/mil.

47. The method of claim 39 wherein at least one of said first outer layer and said second outer layer has sufficient cling resulting from inherent cling alone, cling additives or a combination thereof so as to produce a cling force to the other layer of at least 180 g/inch.

48. The method of claim 39 wherein said stretch wrap film has an F-50 dart drop value of at least about 250 g/mil.

49. The method of claim 39 wherein said stretch wrap film has a force required to elongate the film 200% of at least 1800 psi and a force required to elongate the film 250% of at least 2000 psi.

50. The method of claim 49 wherein said stretch wrap film has a force required to elongate the film 200% of at least 2000 psi and a force required to elongate the film 250% of at least 2250 psi.

51. The method of claim 39 wherein said stretch wrap film comprises from about 80 to about 95 weight percent of said first outer layer and said second outer layer, and comprises from about 5 to about 20 weight percent of said inner polymeric layer.

52. The method of claim 39 wherein said second outer layer is selected from the group consisting of linear low density polyethylene, very low density polyethylene, high pressure low density polyethylene, ethylene-acrylate polymers and mixtures thereof.

53. The method of claim 39 wherein said inherent cling is partially from n-hexane extractables.

54. The method of claim 39 wherein said second outer polymeric layer comprises a polymer of two or more monomers, wherein a first monomer is ethylene, in a major amount by weight, and a second monomer is an alpha olefin of from about 3–12 carbon atoms, in a minor amount by weight.

55. The method of claim 39 wherein said stretch wrap film comprises from about 70 to about 95 weight percent of said first outer layer and said second outer layer, and comprises from about 5 to about 30 weight percent of said inner polymeric layer.

56. The method of claim 55 wherein said stretch wrap film comprises from about 80 to about 95 weight percent of said first outer layer and said second outer layer, and comprises from about 5 to about 20 weight percent of said inner polymeric layer.

57. The method of claim 39 wherein said second outer comprises at least 70 weight percent of a polyethylene resin, said polyethylene resin having a polydispersity of from 1 to 4, a density of from 0.88 to about 0.94 g/cm$^3$, a melt index of from 0.5 to 10 g/10 min., and a melt flow ratio ($I_{20}/I_2$) of from 12 to 22 and said first outer layer comprises at least 70 weight percent of said polyethylene resin.

58. The method of claim 57 wherein said second outer layer and said first outer layer each comprises 100 weight percent of said polyethylene resin.

59. The method of claim 58 wherein said polyethylene resin of said second outer layer and said first outer layer is made from a metallocene catalyst.

60. A multilayer, stretch wrap film comprising:
(a) a first outer layer and a second outer layer, each of said first outer layer and said second outer layer comprises at least 60 weight percent of a polyethylene copolymer prepared using a metallocene catalyst, said polyethylene copolymer having a polydispersity of from 1 to 4, a density of from about 0.912 to about 0.925, a melt index of from about 2 to about 5 g/10 min., and a melt flow ratio ($I_{20}/I_2$) of from 16 to 18, at least one of said first outer layer and said second outer layer having sufficient cling resulting from inherent cling alone, cling additives or a combination thereof so as to produce a cling force to the other layer of at least about 140 grams/inch as determined by ASTM D5458-94;
(b) an inner polymeric layer, located between said first outer layer and said second outer layer, said inner polymeric layer constructed with a high pressure low density polyethylene resin, said high pressure low density polyethylene resin having a density of from about 0.915 to about 0.925, a melt index from about 1 to about 2.5 g/10 min.;
so as to produce a stretch wrap film having a F-50 dart drop value of at least 250 g/mil as determined by ASTM D1709, a machine direction tear resistance of at least about 225 g/mil as determined by ASTM D1922, and a transverse direction tear resistance of at least 700 g/mil as determined by ASTM D1922, a force required to elongate the film 200% of at least 2000 psi, a force required to elongate the film 250% of at least 2250 psi and a maximum stretch of at least 345%.

61. The stretch wrap film of claim 60 wherein said second outer layer and said first outer layer each comprises 100 weight percent of said polyethylene resin.

62. The stretch wrap film of claim 61 wherein said second outer layer and said first outer layer each comprises 100 weight percent of said polyethylene resin.

63. A multilayer, stretch wrap film comprising:
  (a) a first polymeric outer layer comprising at least 40 weight percent of a polyethylene resin, said polyethylene resin having a polydispersity of from 1 to 4, a density of from about 0.88 to about 0.94, a melt index of from 0.5 to 10 g/10 min., and a melt flow ratio ($I_{20}/I_2$) of from 12 to 22;
  (b) a second polymeric outer layer, at least one of said first outer layer and said second outer layer has sufficient cling resulting from inherent cling alone, cling additives or a combination thereof so as to produce a cling force to the other layer of at least about 140 grams/inch as determined by ASTM D5458-94; and
  (c) an inner polymeric layer located between said first outer layer and said second outer layer, said inner polymeric layer comprising a high pressure low density polyethylene resin, said high pressure low density polyethylene resin having a density of from about 0.90 to about 0.935 g/cm³ and a melt index of from about 0.5 to about 10 g/10 min;
so as to produce a stretch wrap film having an F-50 dart drop value of at least 150 g/mil as determined by ASTM D1709, a machine direction tear resistance of at least about 175 g/mil as determined by ASTM 1922, a transverse direction tear resistance of at least 500 g/mil as determined by ASTM D1922 and a maximum stretch of at least 345%.

64. The stretch wrap film of claim 63 wherein said second outer layer comprises at least 40 weight percent of a polyethylene resin, said polyethylene resin having a polydispersity of from 1 to 4, a density of from about 0.88 to about 0.94, a melt index of from 0.5 to 10 g/10 min., and a melt flow ratio ($I_{20}/I_2$) of from 12 to 22.

65. The stretch wrap film of claim 64 wherein said first outer layer comprises at least 60 weight percent of said polyethylene resin and said second outer layer comprises at least 60 weight percent of said polyethylene resin.

66. The stretch wrap film of claim 65 wherein said first outer layer comprises at least 70 weight percent of said polyethylene resin and said second outer layer comprises at least 70 weight percent of said polyethylene resin.

67. The stretch wrap film of claim 63 wherein said cling force is partially from at least one cling additive.

68. The stretch wrap film of claim 63 wherein said second outer layer is selected from the group consisting of linear low density polyethylene, very low density polyethylene, high pressure low density polyethylene, ethylene-acrylate polymers and mixtures thereof.

69. The stretch wrap film of claim 63 wherein the stretch wrap film has a transverse tear resistance of at least 700 g/mil and a machine direction tear resistance of at least 225 g/mil.

70. The stretch wrap film of claim 63 wherein said polyethylene resin of said first outer layer is made with a metallocene catalyst.

71. The stretch wrap film of claim 63 wherein said second outer polymeric layer comprises a polymer of two or more monomers, wherein a first monomer is ethylene, in a major amount by weight, and a second monomer is an alpha olefin of from about 3–12 carbon atoms, in a minor amount by weight.

72. The stretch wrap film of claim 63 wherein said polyethylene resin is a copolymer or terpolymer.

73. The stretch wrap film of claim 63 wherein said inherent cling is partially from n-hexane extractables.

74. A multilayer, stretch wrap film comprising:
  (a) a first polymeric layer comprising at least 60 weight percent of a polyethylene copolymer, said polyethylene copolymer having a polydispersity of from 1 to 4, a density of from about 0.88 to about 0.94, a melt index of from 0.5 to 10 g/10 min., and a melt flow ratio ($I_{20}/I_2$) of from 12 to 22;
  (b) a second polymeric layer, at least one of said first layer and said second layer has sufficient cling resulting from inherent cling alone, cling additives or a combination thereof so as to produce a cling force to the other layer of at least about 140 grams/inch as determined by ASTM D5458-94; and
  (c) an inner polymeric layer, located between said first layer and said second layer, said inner polymeric layer comprises a high pressure low density polyethylene resin, said high pressure low density polyethylene resin having a density of from about 0.915 to about 0.925 g/cm³ and a melt index of from about 0.5 to about 10 g/10 min.; so as to produce a stretch wrap film having an F-50 dart drop value of at least 150 g/mil as determined by ASTM D1709, a machine direction tear resistance of at least about 175 g/mil as determined by ASTM D1922, a transverse direction tear resistance of at least 500 g/mil as determined by ASTM D1922 and a maximum stretch % of at least 345%, and wherein said stretch wrap film comprises from about 70 to about 95 weight percent of said first layer and said second layer, and comprises from about 5 to about 30 weight percent of said inner polymeric layer.

75. The stretch wrap film of claim 74 wherein said stretch wrap film comprises from about 80 to about 95 weight percent of said first layer and said second layer, and comprises from about 5 to about 20 weight percent of said inner polymeric layer.

76. The stretch wrap film of claim 74 wherein said second layer comprises at least 70 weight percent of a polyethylene resin, said polyethylene resin having a polydispersity of from 1 to 4, a density of from 0.88 to about 0.94 g/cm³, a melt index of from 0.5 to 10 g/10 min., and a melt flow ratio ($I_{20}/I_2$) of from 12 to 22 and said first layer comprises at least 70 weight percent of said polyethylene resin.

77. The stretch wrap film of claim 76 wherein said second outer layer and said first outer layer each comprises 100 weight percent of said polyethylene resin.

78. The stretch wrap film of claim 77 wherein said polyethylene resin of said second outer layer and said first outer layer is made with a metallocene catalyst.

79. The stretch wrap film of claim 74 wherein said first layer comprises 100 weight percent of said polyethylene resin.

80. The stretch wrap film of claim 74 wherein said second layer comprises a polymer of two or more monomers, wherein a first monomer is ethylene, in a major amount by weight, and a second monomer is an alpha olefin of from about 3–12 carbon atoms, in a minor amount by weight.

81. The stretch wrap film of claim 74 wherein said second layer is selected from the group consisting of linear low density polyethylene, very low density polyethylene, high pressure low density polyethylene, ethylene-acrylate polymers, and mixtures thereof.

* * * * *